(12) United States Patent
Aykens et al.

(10) Patent No.: US 10,072,770 B2
(45) Date of Patent: Sep. 11, 2018

(54) VALVE BODY ROUGH-IN GUIDE

(71) Applicant: Kohler Co., Kohler, WI (US)

(72) Inventors: Steven Aykens, Seattle, WA (US);
James Wanasek, West Allis, WI (US);
Douglas Brouwer, Sheboygan, WI (US); Erich Slothower, Mill Valley, CA (US); John Wilson, Sheboygan, WI (US); Keegan Ford, Milwaukee, WI (US)

(73) Assignee: KOHLER CO., Kohler, WI (US)

( * ) Notice: Subject to any disclaimer, the term of this patent is extended or adjusted under 35 U.S.C. 154(b) by 14 days.

(21) Appl. No.: 15/244,981

(22) Filed: Aug. 23, 2016

(65) Prior Publication Data

US 2017/0059053 A1  Mar. 2, 2017

Related U.S. Application Data

(60) Provisional application No. 62/209,467, filed on Aug. 25, 2015.

(51) Int. Cl.
*F16K 27/12* (2006.01)
*F16K 27/06* (2006.01)
*E03C 1/02* (2006.01)

(52) U.S. Cl.
CPC ............ *F16K 27/12* (2013.01); *E03C 1/021* (2013.01); *F16K 27/065* (2013.01)

(58) Field of Classification Search
CPC ......... E03C 1/021; F16K 27/065; F16K 27/12
See application file for complete search history.

(56) References Cited

U.S. PATENT DOCUMENTS

| 3,609,774 | A | * | 10/1971 | Allgood | E03C 1/021 |
| | | | | | 137/359 |
| 4,846,207 | A | | 7/1989 | Humpert et al. | |
| 4,964,191 | A | * | 10/1990 | Wyatt | E06B 9/362 |
| | | | | | 16/87.2 |
| 4,979,538 | A | | 12/1990 | Krippendorf et al. | |
| 4,989,633 | A | | 2/1991 | Humpert et al. | |
| 5,457,520 | A | * | 10/1995 | Schell | F16C 13/04 |
| | | | | | 384/419 |
| 5,518,019 | A | | 5/1996 | Clare | |
| 5,934,032 | A | | 8/1999 | Oberdorfer | |

(Continued)

FOREIGN PATENT DOCUMENTS

DE   20 2015 002 927 U1   6/2015
EP       2 489 791 A2     8/2012

OTHER PUBLICATIONS

Partial European Search Report issued in corresponding application No. 16185578 dated Jan. 25, 2017.

*Primary Examiner* — Craig Schneider
*Assistant Examiner* — Kevin Barss
(74) *Attorney, Agent, or Firm* — Foley & Lardner LLP

(57) ABSTRACT

A rough-in guide for a valve body includes a first side and a second side. The first side includes a valve body retaining jaw and a recessed region. The valve body retaining jaw is configured to selectively receive a first portion of the valve body and to secure the valve body to the rough-in guide. The recessed region is configured to receive a second portion of the valve body. The second side is opposite the first side comprising a valve body retaining clip. The valve body retaining clip is configured to selectively secure the valve body to the rough-in guide.

20 Claims, 9 Drawing Sheets

(56) References Cited

U.S. PATENT DOCUMENTS

| | | | |
|---|---|---|---|
| 6,718,569 B2 | 4/2004 | Burger et al. | |
| 7,077,150 B2 | 7/2006 | McNerney | |
| 7,174,580 B1* | 2/2007 | Papierniak | E03C 1/021 4/695 |
| 7,175,158 B2 | 2/2007 | Thomas | |
| 7,204,267 B1* | 4/2007 | Persico | E03C 1/021 137/357 |
| 7,509,971 B2 | 3/2009 | Kajuch | |
| 7,523,837 B2 | 4/2009 | Schoenweger | |
| 7,819,134 B2* | 10/2010 | Izzy | E03C 1/021 137/606 |
| 8,176,934 B2 | 5/2012 | Niver | |
| 8,276,609 B2 | 10/2012 | Frey | |
| 8,820,352 B2 | 9/2014 | Yu | |
| 2006/0231140 A1 | 10/2006 | McNerney | |
| 2010/0132810 A1* | 6/2010 | Pompian | E03C 1/021 137/356 |
| 2010/0219310 A1* | 9/2010 | Rose | E03C 1/021 248/222.14 |
| 2016/0177548 A1* | 6/2016 | Marshall | E03C 1/021 248/544 |
| 2017/0051840 A1* | 2/2017 | Williams | F16K 27/12 |

* cited by examiner

US 10,072,770 B2

VALVE BODY ROUGH-IN GUIDE

CROSS-REFERENCE TO RELATED PATENT APPLICATION

This application claims the benefit of U.S. Provisional Application No. 62/209,467, filed Aug. 25, 2015, which is incorporated herein by reference in its entirety.

TECHNICAL FIELD

The present application relates generally to plumbing fittings, plumbing valves and the like, used throughout plumbing systems and other fluid distribution systems. Specifically, the present application relates to a device which aids in the installation of a valve assembly, plumbing valve, other variations of plumbing valves such as those for use with, a faucet, a sprayer, toilets, latrines, urinals, drinking fountains, eye wash stations, emergency showers, showers, shower heads, shower pans, steam showers, saunas, laundry faucets, utility faucets, bath tubs, spas, sinks, water dispensers, as well as many other fixtures and/or systems used in residential and commercial plumbing applications.

BACKGROUND

In conventional plumbing systems used in residential and commercial structures, a potable water distribution system may be comprised of many lengths of plumbing pipe, pipe connections, numerous water faucets and/or fixtures, hot water heaters, water softeners, water filters and various other plumbing valves, meters, etc. During the installation and connection of residential and commercial plumbing pipe, many valve assemblies may need to be installed. These valve assemblies typically include a valve body and one or more pipe fittings in additional to other plumbing hardware.

SUMMARY

One implementation of the present disclosure relates to a rough-in guide for a valve body. The rough-in guide includes a first side and a second side. The first side includes a valve body retaining jaw and a recessed region. The valve body retaining jaw is configured to selectively receive a first portion of the valve body and to secure the valve body to the rough-in guide. The recessed region is configured to receive a second portion of the valve body. The second side is opposite the first side comprising a valve body retaining clip. The valve body retaining clip is configured to selectively secure the valve body to the rough-in guide.

Another implementation of the present disclosure relates to a prepackaged valve assembly. The prepackaged valve assembly includes a valve body and a one-piece rough-in guide. The one-piece rough-in guide corresponds to the valve body. The one-piece rough-in guide includes a first side and a second side. The first side includes a recessed region. The recessed region is configured to selectively receive the valve body and to secure the valve body to the one-piece rough-in guide. The second side is opposite the first side. The second side includes a valve body retaining clip. The valve body retaining clip is configured to selectively secure the valve body to the one-piece rough-in guide.

Yet another implementation of the present disclosure relates to a rough-in guide for a valve body. The rough-in guide includes a recessed region and a valve body retaining clip. The recessed region is configured to receive the valve body. The valve body retaining clip is configured to selectively secure the valve body to the rough-in guide. The valve body retaining clip includes a flexible member configured to be biased by an interaction with the valve body.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Figure 1:
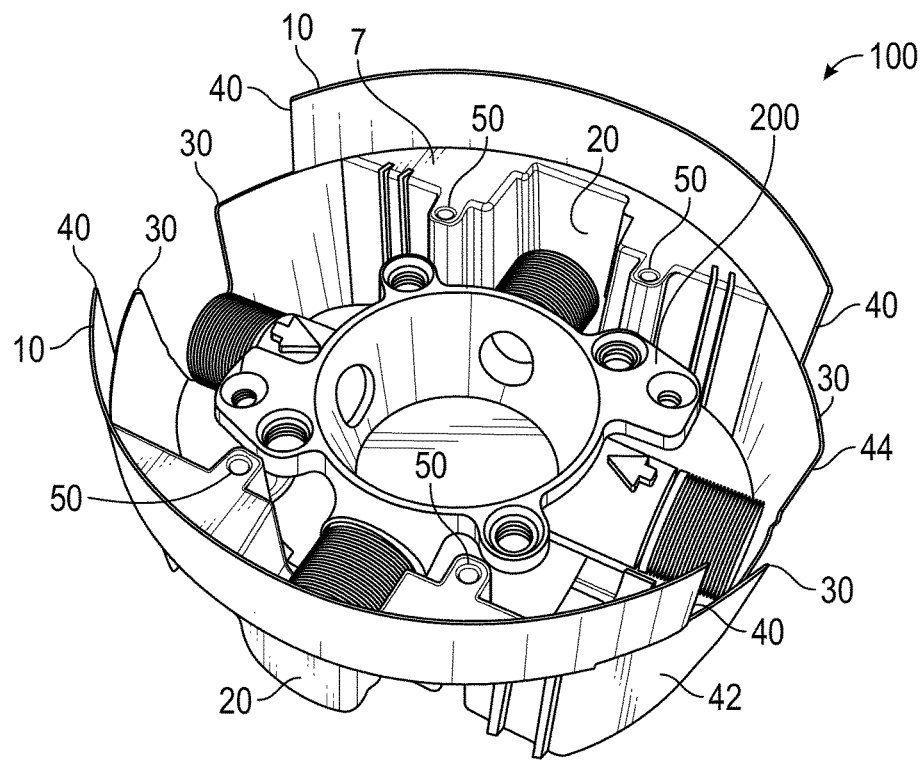
FIG. 1 is a perspective view of a valve body inserted in a valve body rough-in guide for a valve assembly, according to one embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in one or more devices for various types of applications or systems.

Installing valve assemblies can often include several steps. Typically, an operator will determine a center point for the valve assembly, drill a small pilot hole on the center point, and then subsequently drill a large hole using a hole saw of a desired diameter for the valve assembly. Some valve bodies contain a valve assembly securing extrusion which is designed to be inserted into a backing board to prevent excessive vibrations of the valve assembly once installed. Before drilling the pilot hole, it is common for the operator to secure the backing board behind the wall material to be drilled through. In applications where the backing board is used, the pilot hole also extends into the backing board. In these applications, an operator will then trace the diameter of the valve assembly securing extrusion on the backing board and then create a hole of the corresponding diameter in the backing board. Typically, pipe fittings and an installation guard are then installed into the valve assembly.

In many situations, typical installation of a valve assembly requires the use of more than one operator. While a first operator holds the valve assembly with installed pipe fittings and installation guard against the wall material, a second operator secures the valve assembly into place. The first operator then installs the backing board by inserting the valve assembly securing extrusion into the recess in the backing board, and then fastens the backing board to a surrounding frame. In order to set a depth for the valve assembly, a combination of the thickness of the backing board and the depth of the recess in the backing board must be determined. It also may be necessary to position the back board in an alternate fashion so as to permit additional valve assembly installation depths. Next, one or more pipes are inserted into the pipe fitting already installed in the valve assembly. Finally, a fluid supply to the pipes is turned on and fluid is permitted to flow through the valve assembly.

When installing valve assemblies according to the standard manner as outlined above, the operator may run into several difficulties. First, the operator may not easily be able to produce an indication of the finished wall hole size on the wall material. For example, in many bathroom applications intricate patterns and/or designs may be incorporated into the wall material. In order to position the hole for the valve assembly in an acceptable location, such that the patterns and/or designs are impacted as minimally as possible, it is necessary to create a template for the finished wall hole size. In addition, it is difficult for the operator to correctly gauge the depth from the valve to a mounting surface. Using a backing board and a recess leaves room for error and is time consuming.

In addition, in typical applications no mechanism exists for ensuring the installation angle of the valve assembly within the wall material. In many applications, it is desired that the valve assembly be installed at a particular angle; for example, certain applications exist where non-flexible piping is inserted into the valve body at an exact angle in order to ensure fitment and a strong fluidic seal. In addition, it is often desirable to operators to ensure that no water is allowed to leak out from the valve assembly behind a finished wall. Allowing water behind the finished wall may promote the growth of mildew, mold, and have other potentially harmful consequences. In addition, it is difficult for an operator to ensure that no fasters fall behind the finished wall which, in some cases, results in the loss of the fastener. In order to replace the lost fastener an operator must expend more time and energy, resulting in further inefficiencies. In addition, when installing a valve assembly in a thin wall material 310, supplementary structural support is often needed. In these cases, operators typically construct a supplementary support system behind the thin wall material which results in longer installation times and higher fiscal expenses. In addition, it is difficult for the operator to shield the sensitive valve assembly cartridge component connection areas from finishing materials. Contamination of these sensitive areas can lead to damaged cartridge components and/or improperly operating or non-operational valve assemblies. In addition, the valve bodies may be damaged in shipping. This is largely a concern due to the irregular shape of valve bodies when compared to readily available packaging materials.

Various embodiments disclosed herein are directed to a valve body rough-in guide that assists operators with a wide range of problems related to installing a valve assembly and/or valve body, that is installed on a valve body during shipping, and is constructed such that the valve body rough-in guide includes a template, a depth gauge recess, a level rest, a funnel (recessed region), a fastener catch (recessed region), a structural support system (second side), a trim attachment (first side), and a shield (first side). Such valve body rough-in guides may allow for operators to, simply and efficiently, install a valve assembly and/or valve body in the most effective manner possible.

FIG. 1 illustrates one embodiment of a valve body rough-in guide 100 for use with a valve body, such as the valve body 200 shown. The valve body rough-in guide 100 includes a first side 7 and an opposite second side 5. The first side 7 may include one or more level rests 40, tracing edges 10, depth gauge recesses 30, and/or recessed regions 20. The second side 5 may include one or more valve body retaining clips 120, one or more valve body retaining guides 130, one or more fastener attachment points 140, one or more supporting posts 210, one or more valve assembly (e.g., valve body, etc.) supports 150, and one or more fastener channels 50. According to various embodiments, the valve body rough-in guide 100 includes a lateral face 42. In some embodiments, the lateral face 42 includes a contoured and partially-arcuate cut-out 44.

The valve body rough-in guide 100 may be constructed from many suitable materials. For instance, the valve body rough-in guide 100 may be constructed of a polymer or a polymer blend such as polyvinyl chloride, other suitable plastics, and other polymer blends. In other applications, the valve body rough-in guide 100 may be constructed of a metallic material such as a steel or aluminum alloy.

According to various embodiments, the valve body rough-in guide 100 has a one-piece construction. By utilizing a one-piece construction, the valve body rough-in guide 100 can be easily reused for a variety of different valve bodies 200. Similarly, the valve body rough-in guide 100 may be easier for a customer to use in application. Further, the valve body rough-in guide 100 may be advantageously produced (e.g., in a more cost effective manner, etc.) if a one-piece construction is utilized. In alterative applications, the valve body rough-in guide 100 is a multi-piece construction.

The first side 7 is intended to have multi-functionality that enables an operator to perform at least the following operations: provide a protective packaging for a valve body 200 during shipping, measure the relative angle of the proposed valve body 200 installation using a leveling device, determine the total material that will be removed using tracing edges 10, protect the wall material 310 (see FIG. 3) from fluid leaks, prevent the loss of fasteners 400 during installation, and shield the valve assembly components (e.g., sensitive valve cartridge components) from debris and other materials during installation. The second side 5 is intended to have multi-functionality that enables an operator to perform at least the following operations: provide a trim attachment for installations using concentric valve trim, install a valve body 200 at a depth from the wall material 310, and provide a structural support system for installations on thin wall materials 310.

Provided on the first side 7 of valve body rough-in guide are many features useful to operators during the installation of the valve body 200 and/or a valve assembly. The first side 7 is intended to be utilized during the shipment and transportation of the valve body 200 and to protect the valve body 200 from being damaged. Through the use of the valve body rough-in guide 100 and a marking implement 900, an operator may use tracing edges 10 on the first side 7 to create a template for the hole (e.g., a traced outline of the valve body rough-in guide 100) that will be created in the wall material 310. Such a template is useful in many applications. For instance, in some bathroom applications shower and/or bath installations include tiled walls. In some of the tiled wall applications, intricate designs and/or patterns have been created. In instances where the installation location of the valve assembly can be manipulated, it is often helpful to see the implications of removing a large portion of the wall material 310 before doing so.

According to one embodiment, the tracing edge 10 is substantially smooth in order to promote accurate tracing of the valve body rough-in guide 100. However, according to alternative embodiments, the tracing edge 10 may be jagged or discontinuous. According to one embodiment, the valve body rough-in guide 100 utilizes two tracing edges 10. In alternative embodiments, the valve body rough-in guide 100 may utilize additional tracing edges 10, such as a valve body rough-in guide 100 with four tracing edges 10, or six. In an alternative embodiment, the valve body rough-in guide 100 has a single tracing edge 10. In some embodiments, the tracing edges 10 are substantially straight. In other embodiments, the tracing edges 10 may be curved or of discontinuous (e.g. jagged) structure. In some embodiments, the tracing edges 10 are substantially the same thickness as the material thickness of the valve body rough-in guide 100. In other embodiments, tracing edges 10 may be thinner and configured to have an edge (e.g. a fillet, blade, etc.). In yet other embodiments, tracing edges 10 may be thicker and more substantial than the material thickness of the valve body rough-in guide 100. The tracing edge may also be configured to be any suitable length or width. In some embodiments, the tracing edge 10 is 6.35 mm (0.25 inch), 12.7 mm (0.5 inch), and 19.05 mm (0.75 inch) in height.

In one embodiment, the valve body rough-in guide 100 includes one or more depth gauge recesses 30 and level rests 40. The depth gauge recess 30 and level rests 40 assist an operator in installing the valve body 200 in a wall. According to various embodiments, the depth gage recesses 30 are formed by edges that are coplanar on a plane that is parallel to the wall. However, in an alternative embodiment, the depth gauge recesses 30 are formed by edges that are disposed on different planes that are all parallel to the wall. In an exemplary embodiment, the level rests 40 are formed by edges that are either on the same plane or on a parallel plane. This configuration allows the level rests 40 to receive a leveling device having a constant cross-sectional area. According to various embodiments, the depth gauge recesses 30 are formed by edges that are disposed on a plane that is substantially orthogonal to a plane that edges forming the level rests 40 are disposed on. In some embodiments, the combination of the depth gauge recesses 30 and the level rests 40 is symmetric about a center plane of the valve body rough-in guide 100.

The level rests 40 are configured to receive and support a leveling device. For example, the level rests 40 may receive a smartphone operating a leveling application. According to an alternate embodiment, the valve body rough-in guide 100 contains four level rests 40 and four depth gauge recesses 30. In some embodiments, the edges of the level rests 40 and the depth gauge recesses 30 are substantially smooth in order to promote accurate tracing of the valve body rough-in guide 100. However, according to alternative embodiments, the edges of the level rests 40 and depth gauge recesses 30 may be jagged or discontinuous. In some embodiments, the operator inserts the valve body rough-in guide 100 within the drilled hole and attach the second side 5 of the valve body rough-in guide 100 to the valve body 200. Then, according to the previously embodiment, the operator trims the tracing edges 10 such that the tracing edges 10 are flush with the wall material 310. In order to efficiently utilize a leveling device, it is desirable to have at least two sets of level rests 40 such that the leveling device is fully balanced and supported across the length of the valve body rough-in guide 100. In an alternative embodiment, multiple level rests 40 are incorporated into the valve body rough-in guide 100 for multiple leveling device orientations. For example, in an alternative embodiment, another set of four level rests 40 is offset from the first set of four level rests 40. This would allow for a leveling device to ensure two separate angles meet certain installation constraints. In some embodiments, the level rests 40 are substantially straight. In other embodiments, the level rests 40 may be curved or of discontinuous (e.g. jagged) structure. In some embodiments, the depth gauge recesses 30 are substantially the same thickness as the material thickness of the valve body rough-in guide 100. In other embodiments, the level rests 40 may be thinner and configured to have an edge (e.g. a fillet, blade, etc.). In yet other embodiments, the level rests 40 may be thicker and more substantial than the material thickness of the valve body rough-in guide 100.

The depth gauge recesses 30 are intended to be utilized by operators to ensure a proper installation depth of the valve body 200 through the use of the valve body rough-in guide 100. In addition, the depth gauge recesses 30 allow the operator to trim the depth gauge recesses 30 such that there is virtually no gap between the depth gauge recesses 30 and the inside of the wall material 310. This further protects the wall material 310 from any unintended fluid contact. The length of the depth gauge recesses 30, and therefore the maximum recess depth for the valve body rough-in guide 100, is tailored to suit any installation need. In application, a manufacturer of the valve body rough-in guide 100 may wish to produce a valve body rough-in guide 100 with a five centimeter recess length, and another with a ten centimeter recess length. While according to the exemplary embodiments shown in the figures, it is not necessary that the number of level rests 40 is equal to the number of depth gauge recesses 30. In an alternative embodiment, the valve body rough-in guide 100 includes numerous depth gauge recesses 30 and no level rests 40. In another alternative embodiment, the valve body rough-in guide includes numerous level rests 40 and no depth gauge recesses 30. In yet another alternative embodiment, the valve body rough-in guide 100 utilizes two level rests 40 rather than four. In some embodiments, the depth gauge recesses 30 are substantially straight. In other embodiments, the depth gauge recesses 30 may be curved or of discontinuous (e.g. jagged) structure. In some embodiments, the depth gauge recesses 30 are substantially the same thickness as the material thickness of the valve body rough-in guide 100. In other embodiments, the depth gauge recesses 30 may be thinner and configured to have an edge (e.g. a fillet, blade, etc.). In yet other embodiments, the depth gauge recesses 30 may be thicker and more substantial than the material thickness of the valve body rough-in guide 100.

An additional feature that may be provided on the first side 7 is one or more recessed regions 20. According to various embodiments, the recessed regions 20 are configured to receive a portion of the valve body 200. In some embodiments, the recessed regions 20 are configured to securely receive portions of the valve body 200 such that the valve body 200 is retained in the valve body rough-in guide 100. In an exemplary embodiment, the recessed regions 20 are configured to receive a different portion of the valve body 200 than the valve body retaining jaws 160. According to various embodiments, the recessed regions 20 are configured to secure the valve body 200 to the valve body rough-in guide 100. In these embodiments, the face of the recessed regions 20 that is configured to interface with the valve body 200 is contoured and arcuate. In some embodiments, the valve body 200 protrudes from the valve body rough-in guide 100. In other embodiments, the valve body 200 is contained within the valve body rough-in guide 100 (e.g., for prepackaging, etc.). Further, when the operator wishes to service the valve body 200, the operator may remove the valve cartridge or operate on the main bore of the valve body 200. This may cause the unintended discharge of fluid from the valve body 200.

In some embodiments, the recessed regions 20 and the tracing edges 10, serve to seal the wall material 310 from the fluid. The recessed regions 20 are large enough that they do not impede the axial translation of the valve body into or out of the valve body rough-in guide 100. The recessed regions 20 are intended to shield the wall material 310 from any fluid that may leak from or escape through the valve assembly during installation. In addition, the recessed regions 20 are intended to catch fasteners 400 that may inadvertently be released by an operator. In this fashion, the recessed regions 20 and the tracing edges 10 will work in conjunction. In order to catch fasteners 400, the recessed regions 20 may have a substantially flat side oriented parallel to the ground. In some embodiments, the recessed regions 20 are substantially U-shaped. In some embodiments, the recessed regions 20 have a planar bottom. In some embodiments, the recessed regions 20 are included relative to the level rests 40. In some embodiments, the recessed regions 20 may have a substantially U-shaped side wall and a planar bottom configured to direct fluid from the valve body 200 out of the valve body rough-in guide 100.

An additional feature that may be provided on the first side 7 is one or more valve body retaining jaws 160. The valve body retaining jaws 160 receive a portion of the valve body 200 when it is inserted into the first side 7. The valve body retaining jaws 160 secure the valve body 200 in place during transportation. In an exemplary embodiment, the valve body retaining jaws 160 are configured to selectively receive a portion of the valve body 200 to secure the valve body 200 to the valve body rough-in guide 100. According to one embodiment, the valve body rough-in guide 100 contains a collinear set of two valve body retaining jaws 160. According to an additional embodiment, the first side 7 may contain valve body retaining jaws 160 offset at an angle or contain valve body retaining jaws 160 that are orthogonally orientated. According to an additional embodiment, the valve body rough-in guide 100 may not contain any valve body retaining jaws 160. In some embodiments, the valve body retaining jaws 160 may have a friction locking mechanism intended to fit around the valve body 200 when the valve body 200 is inserted into the valve body retaining jaws 160. In some embodiments, the valve body retaining jaws 160 may be substantially shaped U-shaped to receive a valve body and configured to have deformations to secure the valve body 200 in the valve body retaining jaws 160. According to various embodiments, the valve body retaining jaws 160 include a contoured and arcuate face configured to interface with the valve body 200. The contoured and arcuate face of the valve body retaining jaws 160 may include projections configured to provide a friction locking mechanism. In an exemplary embodiment, the contoured and partially-arcuate cut-out 44 is substantially aligned with the contoured and arcuate face of the valve body retaining jaws 160.

Figure 2:
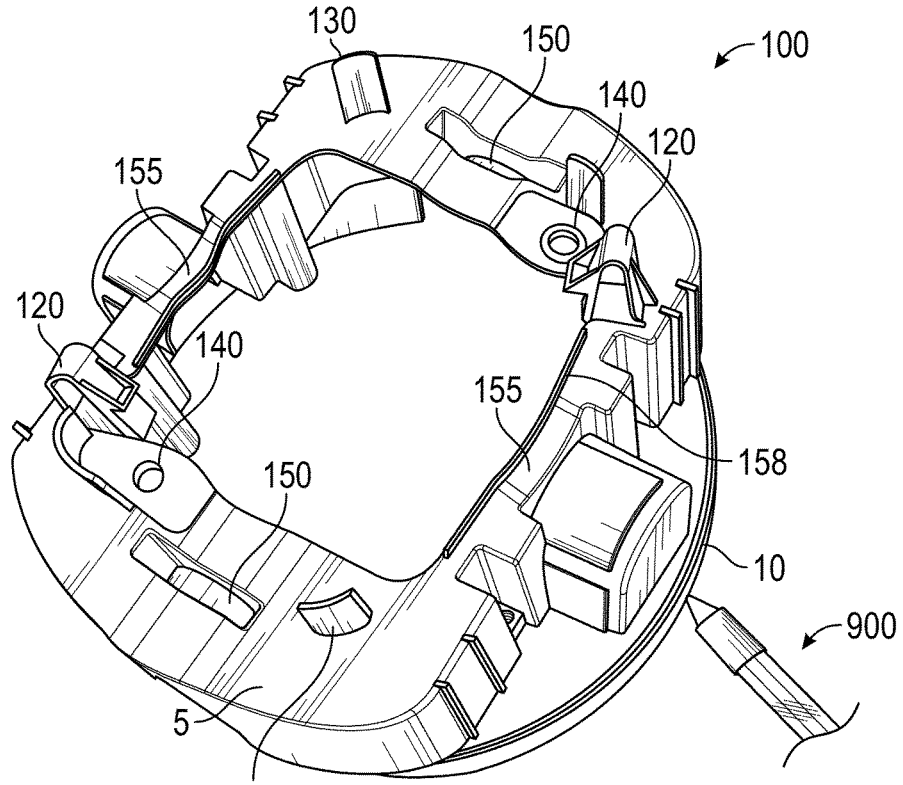
FIG. 2 is a perspective view of the valve body rough-in guide, according to one embodiment.

FIG. 2 illustrates one embodiment of a valve body rough-in guide 100 for use with a valve body 200, such as the valve body 200 shown in FIG. 1. Provided on the second side 5 of valve body rough-in guide 100 are many features useful to operators during the installation of a valve body 200 and/or a valve assembly. The second side 5 is intended to be used by operators in applications where additional structural support of the valve body 200 and/or valve assembly is desirable. One of such applications is the installation of a valve body 200 and/or valve assembly behind a relatively thin section of wall material 310. Typically, when a valve body 200/and or valve assembly must be installed behind a relatively thin wall material 310, the valve body 200 and/or valve assembly cannot be secured in place. As a result, the valve body 200 and/or valve assembly may vibrate freely due to fluid effects. These vibrations can have negative consequences on the integrity of the valve body 200, the valve assembly, and the entire plumbing system. The second side 5 may contain one or more valve body retaining clips 120 and one or more valve body retaining guides 130. According to one embodiment, the valve body rough-in guide contains two valve body retaining clips 120 and two valve body retaining guides 130. According to alternative embodiments, the valve body rough-in guide 100 may utilize any combination and any number of valve body retaining clips 120 and valve body retaining guides 130. For example, valve body rough-in guide 100 may have four valve body retaining clips 120 and no valve body retaining guides 130 and vice versa.

The valve body retaining clips 120 are configured to secure the valve body 200 to the valve body rough-in guide 100. According to various embodiments, the valve body retaining clips 120 are configured to selectively secure the valve body 200 to the valve body rough-in guide 100. In an exemplary embodiment, the valve body retaining clips 120 comprise a flexible member that is configured to be biased by an interaction with the valve body 200. The flexible member may include a prong that is configured to interface with the valve body 200. The valve body rough-in guides 100 may take the shape of any suitable form but are intended to engage the valve body 200 upon installation of the valve body 200 into the valve body rough-in guide 100. In various embodiments, the valve body retaining guides 130 and the supporting posts 210 include an arcuate wall configured to receive a corner of the valve body 200. According to one embodiment, the valve body retaining guides 130 are channel shaped and intended to guide the corners of the valve body 200 into the valve body rough-in guide 100.

The valve body retaining guides 130 may selectively retain the valve body 200 in place and prevent undesirably movement of the valve body 200. The valve body retaining clips 120 are intended to be of the single lock variety, as shown in the figures. However, according to alternative embodiments other variations of the valve body rough-in clip may be used including: a saw tooth style clip, a magnetic clip, a pin style clip, a ball and socket style clip, a friction fit clip, and many other suitable variations.

According to another exemplary embodiment, the valve body rough-in guide may contain one or more supporting posts 210 to help support the valve body rough-in guide 100 when the first side 7 is being subjected to a load. According to this exemplary embodiment, the height of the supporting posts 210 and the valve body retaining guides 130 are the same. The second side 5 also may contain one or more fastener attachment points. When the valve body 200 is installed into the second side 5, it may be necessary for additional securing mechanisms to hold the valve body 200 in place. In these instances, the fastener attachment points 140 could be used such that a fastener 400 (e.g., a bolt and nut, a rivet, etc.) may fasten the valve body 200 to the valve body rough-in guide 100. According to an exemplary embodiment, the fastener attachment points 140 extend through the first side 7 and the second side 5. In other applications, the fastener attachment points 140 are embedded in at least one of the first side 7 and the second side 5.

Another feature that may be provided on the second side 5 is one or more valve assembly supports 150. In various embodiments, the valve assembly supports 150 are recessed contours shaped to receive portions of the valve body 200. The valve assembly supports 150 provide support for the valve assembly such that the valve body 200 may seat in an optimal manner on the second side 5. In one embodiment, there are two valve assembly supports 150 on the second side 5. According to alternative embodiments, the second side 5 may be constructed in such a way that valve assembly supports 150 are not necessary, or that larger or smaller valve assembly supports 150 are necessary. The valve assembly supports 150 can be sized to fit any diameter piping and any size valve body 200 and/or valve assembly.

Yet another feature that may be provided on the second side 5 is one or more valve assembly (e.g., valve body, etc.) risers 155. The valve assembly risers 155 provide support for the valve assembly such that the valve body 200 may seat in an optimal manner on the second side 5. According to various embodiments, the valve assembly risers 155 protrude from the valve body rough-in guide 100. In some applications, the valve assembly risers 155 may provide a flanged fluidic seal between the valve body and the second side 5. In application, when an operator services a valve body 200 installed in a valve body rough-in guide 100 (e.g. the operator replaces a valve cartridge), fluid lakes from the valve body. The valve assembly risers 155 provide an additional seal to ensure that a minimal amount of fluid, if any, leaks from the valve assembly to the wall material 310. In one embodiment, there are two valve assembly risers 155 on the second side 5. According to alternative embodiments, the second side 5 may be constructed in such a way that valve assembly risers 155 are not necessary, or that larger or smaller valve assembly risers 155 are necessary. The valve assembly risers 155 can be sized to fit any diameter piping and any size valve body 200 and/or valve assembly.

According to various embodiments, the valve body rough-in guide 100 includes a central opening 158 extending through the first side 7 and the second side 5. The central opening 158 is configured to receive at least a portion of the valve body 200. According to various embodiments, the central opening 158 is generally rectangular and is defined by a first edge, a second edge, a third edge, and a forth edge. Following this embodiment, the central opening may have a first corner between the first edge and the second edge, a second corner between the second edge and the third edge, a third corner between the third edge and the fourth edge, and a fourth corner between the fourth edge and the first edge. The corners may be generally rounded. According to various embodiments, the valve body retaining clips 120 may be configured to protrude from the second side 5, protrude through the central opening 158, and protrude from the first side 7. In some embodiments, the valve body retaining clips 120 are located proximate the corners of the central opening 158.

An additional feature that may be provided on the second side 5 is one or more fastener channels 50. The fastener channels 50 allow the operator to secure the valve body rough-in guide 100 to the wall. In application, one side of the fastener 400 secure the valve body rough-in guide 100 to a finishing plate (e.g. a trim attachment, cover, etc.) 1000 on the finished side of the wall material 310. In one embodiment, there are four fastener channels 50, with the set of fastener channels 50 forming a rectangle centered on the central point of the valve body rough-in guide 100. The spacing of the fastener channels 50 can be adapted to fit any desired installation parameters. For example, if a finishing plate 1000 necessarily has a different spacing or number of fastener channels 50, the manufacturer of the valve body rough-in guide 100 can effortlessly adapt the design to account for those subtle differences. The diameter of the fastener channels 50 can also be modified to suit given design needs. For typical installation, a relatively small diameter fastener 400 may be used. However, for more substantial valve assemblies, it may be desirable to have additional structural support and security. In these cases, a valve body rough-in guide 100 may be constructed that contains larger fastener channels 50, to permit the use of larger diameter fasteners, or a greater number of fastener channels 50, to permit for the use of additional fasteners 400. While typical installations will utilize a finishing plate 1000 to secure the valve body rough-in guide 100 to a wall material 310, it should be noted that this is not necessary and that valve body rough-in guide 100 may be secured directly to a wall.

According to one embodiment, the valve body rough-in guide 100 is installed along with the valve body 200 and/or valve assembly. According to additional exemplary embodiments, the valve body rough-in guide 100 is removed prior to installing the valve body 200 and/or valve assembly. The valve body 200 may be removed from the valve body rough-in guide 100 through interaction with the valve body retaining clips 120. Typically, the valve body rough-in guide 100 is installed in applications where additional structural support is desirable. For instance, when installing a valve body 200 and/or valve assembly behind a relatively thin wall, additional support will be necessary to ensure that the valve body 200 and/or valve assembly is secured and unable to excessively vibrate. In these applications, securing the valve body 200 and/or valve assembly to the surrounding enclosure may prove difficult or ineffective. In other applications, such as the installation of a valve body 200 and/or valve assembly behind a location with a relatively thick and substantial wall, installing the valve body rough-in guide 100 may not be necessary. The valve body rough-in guides 100 are intended to be re-useable and may be numbered or have other suitable indicia to facilitate verification that all valve body rough-in guides 100 are accounted for after an installation.

Figure 3:
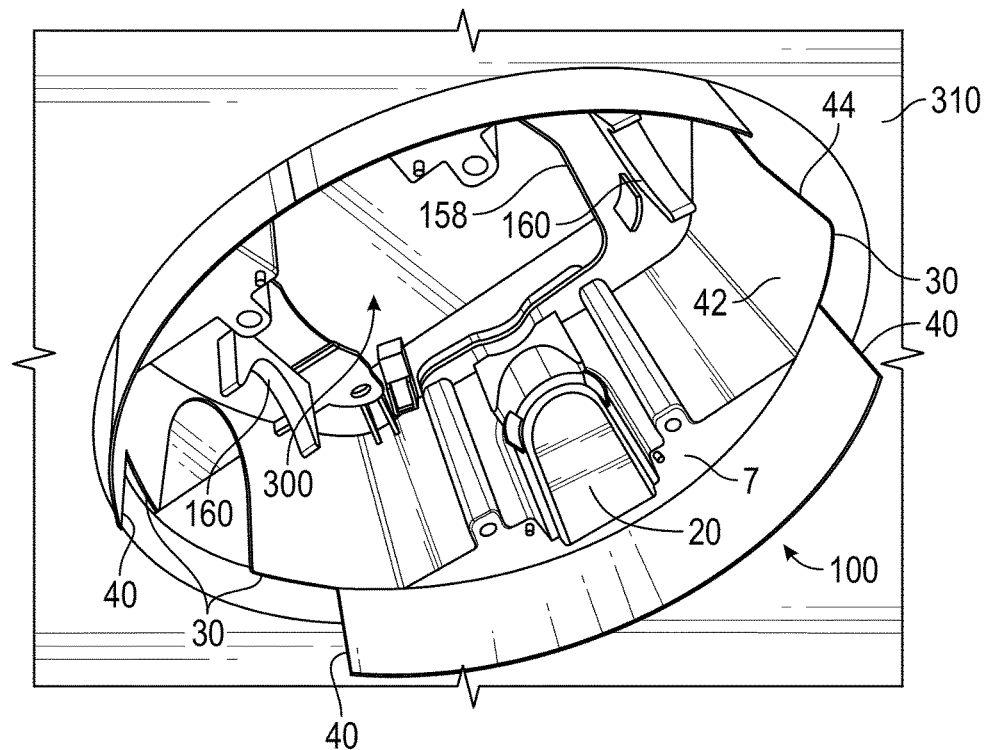
FIG. 3 is a perspective view of the valve body rough-in guide mated to a mounting surface, according to one embodiment.

FIG. 3 illustrates one embodiment of a valve body rough-in guide 100 for use with a valve body 200, such as the valve body 200 shown in FIG. 1, mated to a wall material 310. FIG. 3 specifically illustrates the manner in which the depth gauge recess operates. An operator will align the depth gauge recess such that the angle between the depth gauge recess and the level rest mates with the wall material 310.

This ensures that the valve body 200 and/or valve assembly is installed in an effective and acceptable manner.

Figure 4:
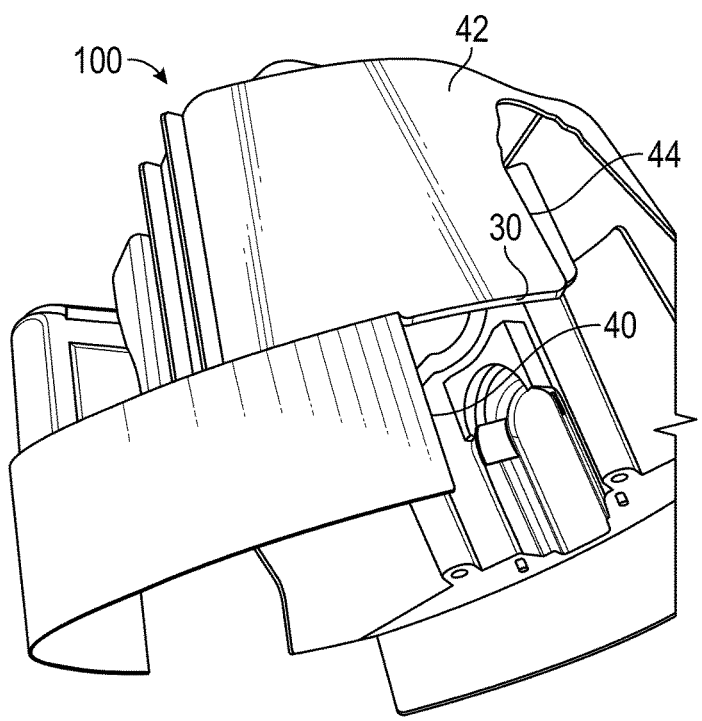
FIG. 4 is another perspective view of the valve body rough-in guide shown in FIG. 2.

FIG. 4 illustrates one embodiment of a valve body rough-in guide 100 for use with a valve body 200, such as the valve body 200 shown in FIG. 1. FIG. 4 further shows the interaction between the depth gauge recess and the level rest. According to one embodiment, the level rest and the depth gauge recess are orthogonally oriented such that a wall material 310 may mate with both the level rest and the depth gauge recess. According to alternative embodiments, the depth gauge recess and/or the level rest may take another shape suitable to a particular application. For instance, it may be desirable to have an angled level rest in order to properly measure depth in particular applications. According to alternative embodiments, the depth gauge recess and the level rest may not be structurally proximate and continuous.

Figure 5:
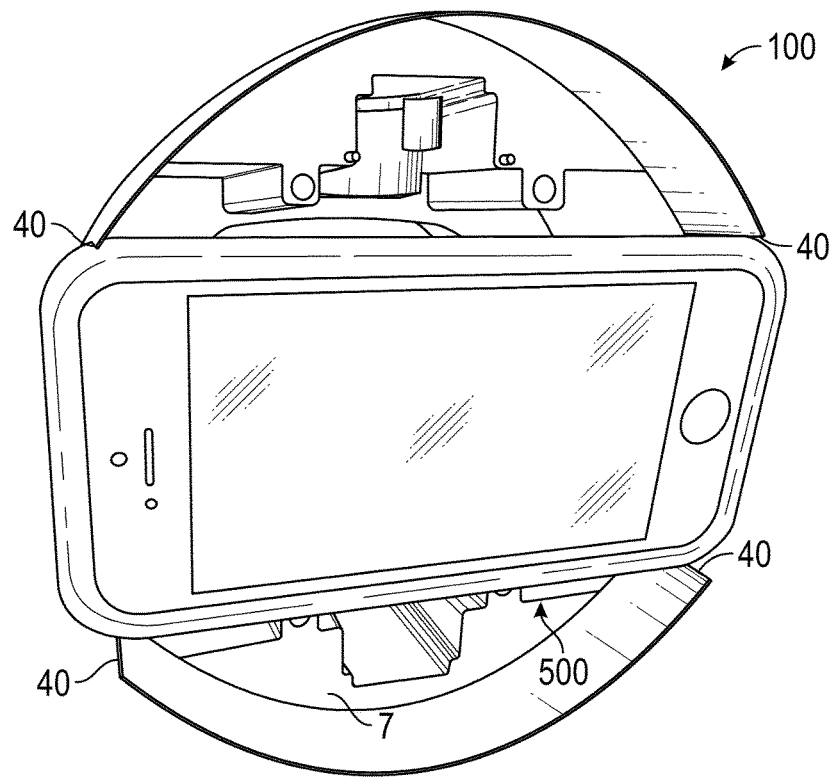
FIG. 5 is another perspective view of the valve body rough-in guide shown in FIG. 2.

FIG. 5 illustrates one embodiment of a valve body rough-in guide 100 for use with a valve body 200, such as the valve body 200 shown in FIG. 1. FIG. 5 illustrates the use of a leveling device 500 (e.g., a level, a cell phone with a leveling application, etc.) within the valve body rough-in guide 100. The leveling device 500 is placed on the level rests 40, which are provided on the first side 7, such that it is balanced and secure.

Figure 6:
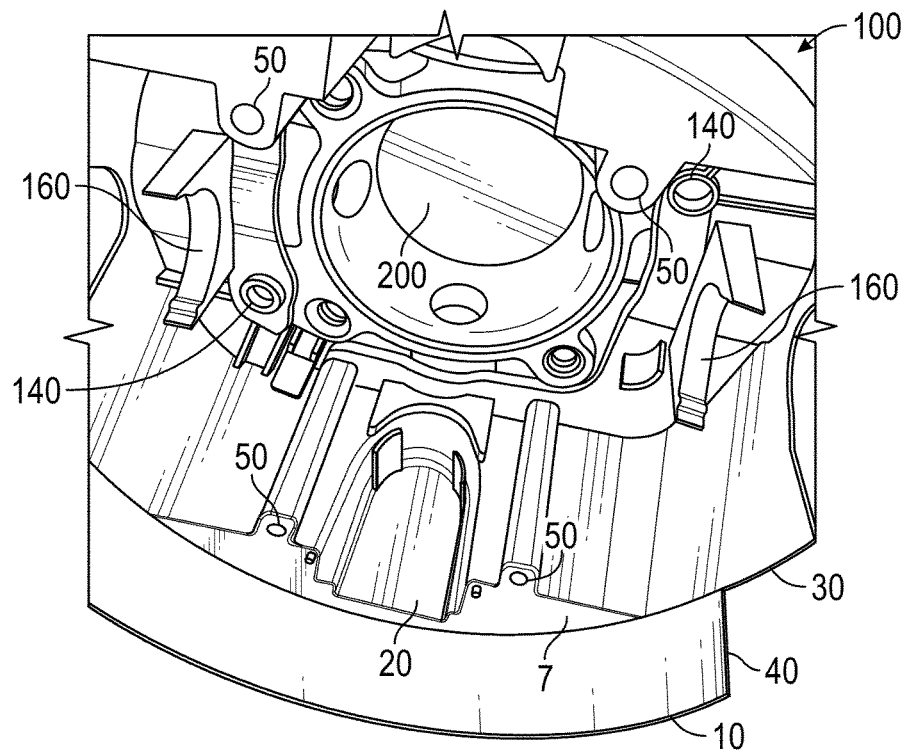
FIG. 6 is another perspective view of the valve body rough-in guide shown in FIG. 2.

FIG. 6 illustrates one embodiment of a valve body rough-in guide 100 for use with a valve body 200, such as the valve body 200 shown. FIG. 6 illustrates the first side 7 where a valve body 200 is partially installed in the valve body rough-in guide 100. As can be seen, the fastener attachment points 140 have not yet been mated with fasteners 400 to secure the valve body 200 to the valve body rough-in guide 100. FIG. 6 also illustrates the manner in which a valve body 200 and/or valve assembly may fit within the second side 5.

Figure 7:
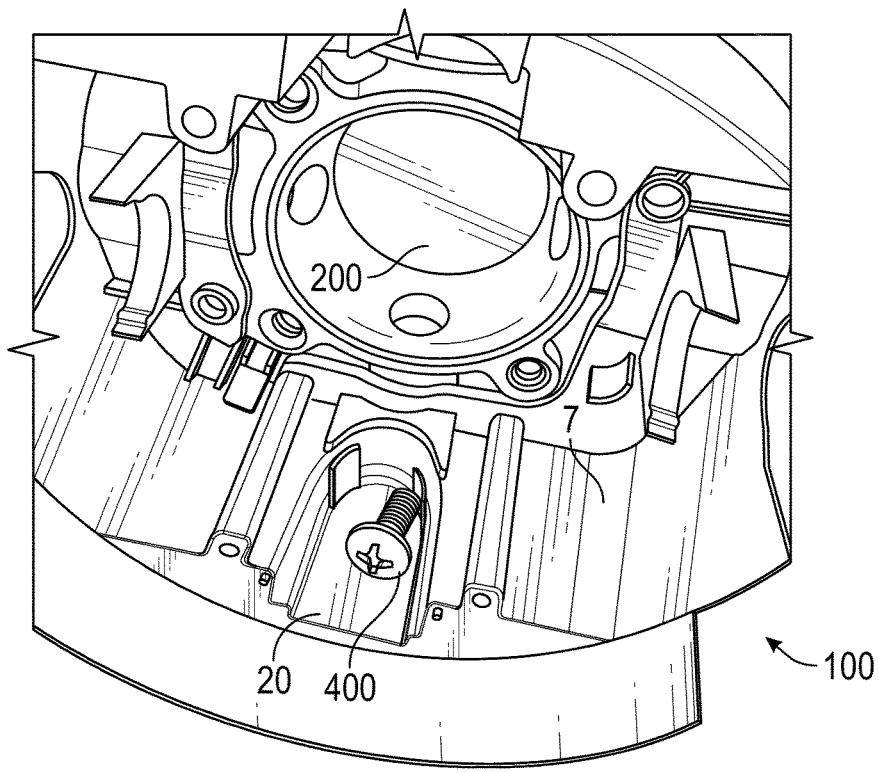
FIG. 7 is another perspective view of the valve body rough-in guide shown in FIG. 2.

FIG. 7 illustrates one embodiment of a valve body rough-in guide 100 for use with a valve body 200, such as the valve body 200 shown. FIG. 7 illustrates where a fastener 400 would be located if it was accidently released by an operator during the installation of a valve body 200 and/or valve assembly using the valve body rough-in guide 100. As is illustrated by FIG. 7, the recessed region provides a type of funnel for catching unintentionally released fasteners 400 and other parts.

Figure 8:
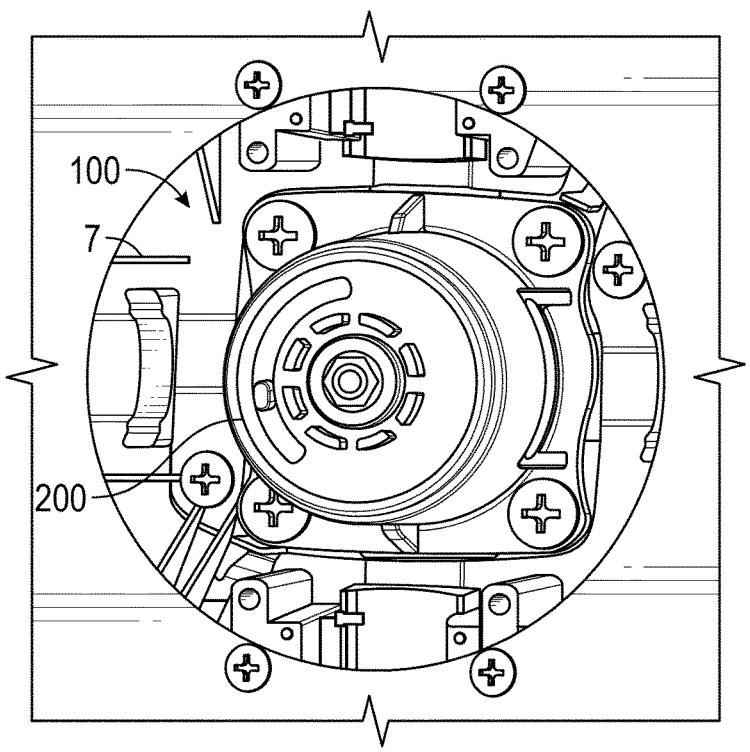
FIG. 8 is a perspective view of the installed valve body rough-in guide including a valve body.

FIG. 8 illustrates one embodiment of a valve body rough-in guide 100 for use with a valve body 200, such as the valve body 200 shown. FIG. 8 illustrates a valve body 200 installed within the valve body rough-in guide 100 and installed within an application. Typically, this installation would be performed if more structural support for the valve body 200/and or valve assembly was desirable.

Figure 9:
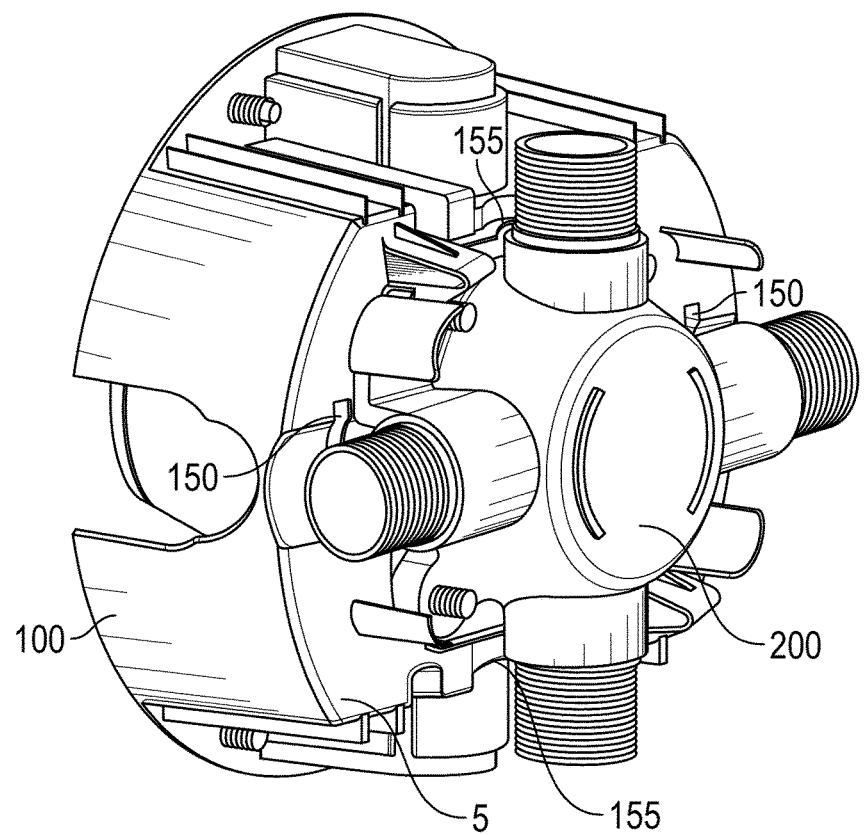
FIG. 9 is another perspective view of the installed valve body rough-in guide including a valve body shown in FIG. 8.

FIG. 9 illustrates one embodiment of a valve body rough-in guide 100 for use with a valve body 200, such as the valve body 200 shown. FIG. 9 is an illustration of FIG. 8, shown from behind the wall. According to one embodiment, the valve body rough-in guide 100 contains valve assembly risers 155 and valve assembly supports 150. As illustrated by FIG. 9, the valve body 200 is supported by the valve assembly risers 155 and the valve assembly supports 150 when installed in the second side 5.

Figure 10:
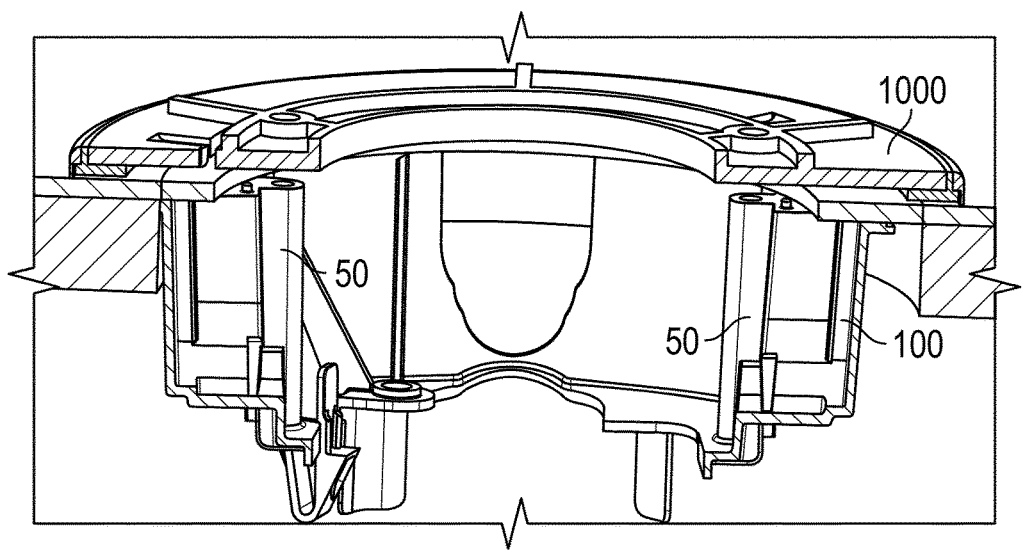
FIG. 10 is a section view of the installed valve body rough-in guide, according to one embodiment.

FIG. 10 illustrates one embodiment of a valve body rough-in guide 100 for use with a valve body 200, such as the valve body 200 shown in FIG. 9. FIG. 10 illustrates a section view of the valve body rough-in guide 100 installed in an application. According to one embodiment, the valve body rough in guide may be secured to a finishing plate 1000 on the opposite side of the wall material 310. FIG. 10 illustrates the path in which a fastener 400 would travel through the fastener channel 50 to secure the valve body rough-in guide 100 to the wall.

Figure 11:
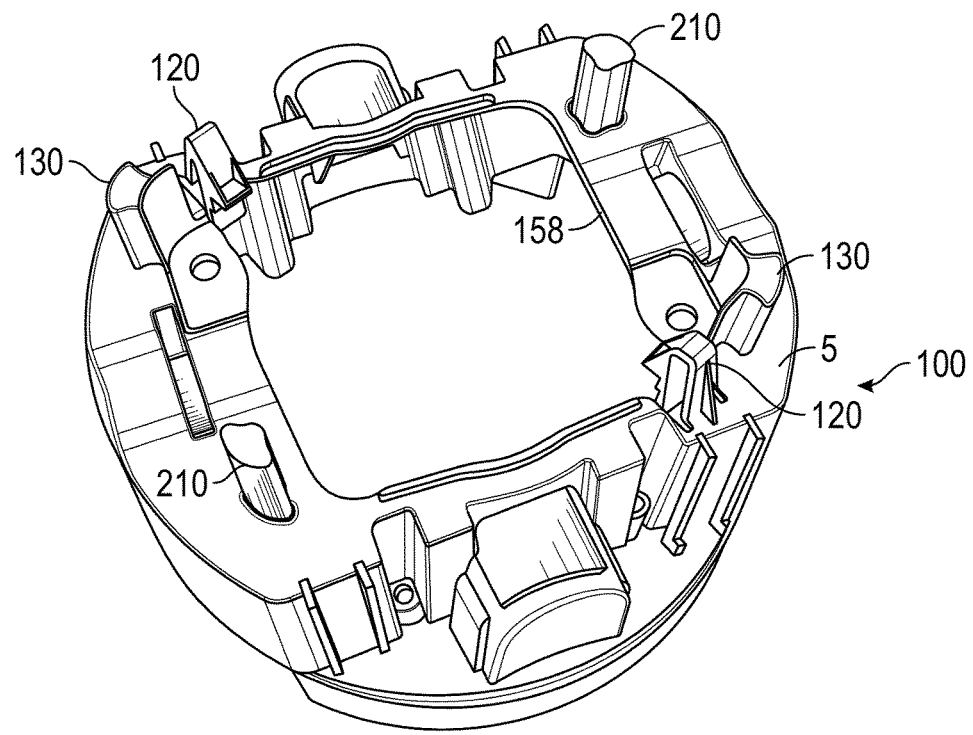
FIG. 11 is a perspective view of a valve body rough-in guide, according to one embodiment.
Figure 12:
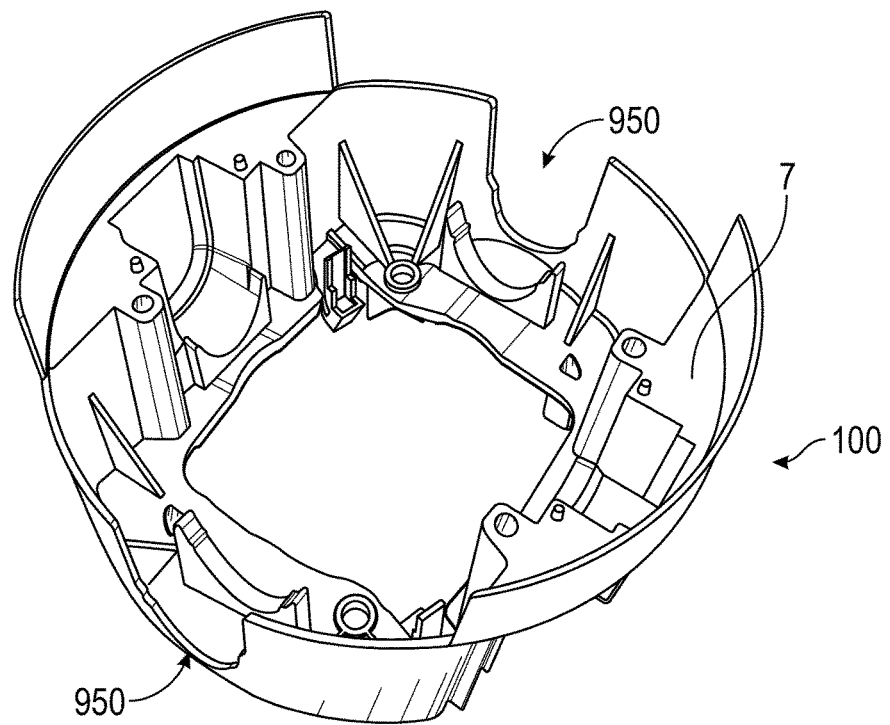
FIG. 12 is a perspective view of the valve body rough-in guide shown in FIG. 11.
Figure 13:
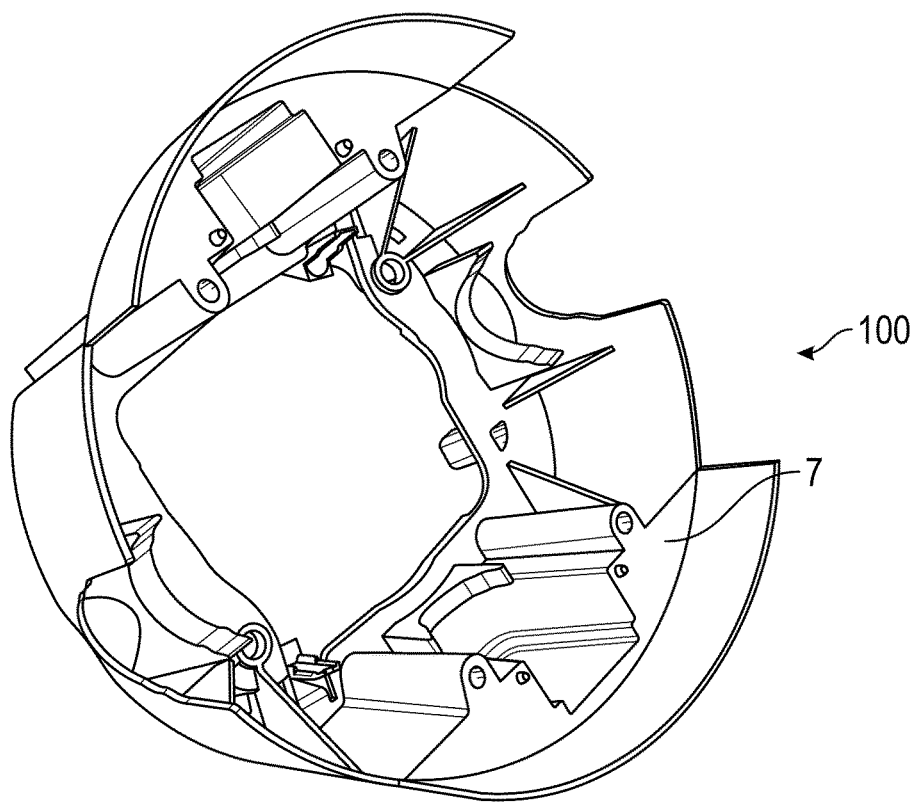
FIG. 13 is a perspective view of the valve body rough-in guide shown in FIG. 11.
Figure 14:
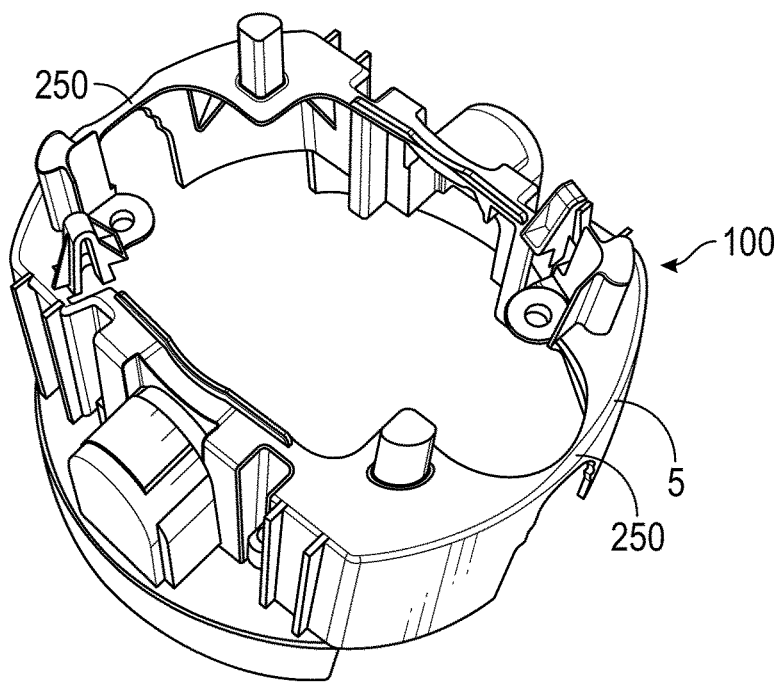
FIG. 14 is a perspective view of a valve body rough-in guide, according to one embodiment.
Figure 15:
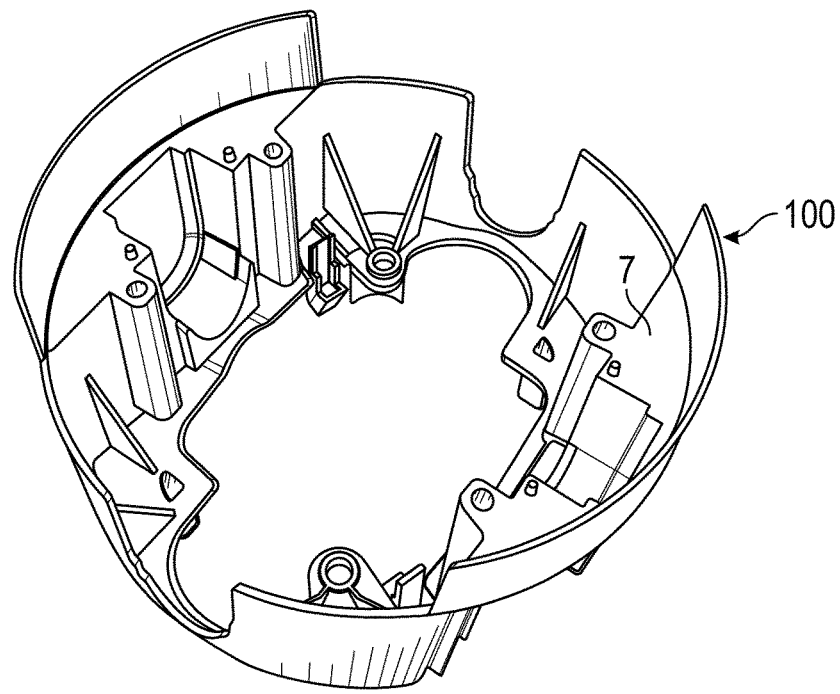
FIG. 15 is a perspective view of the valve body rough-in guide shown in FIG. 14.
Figure 16:
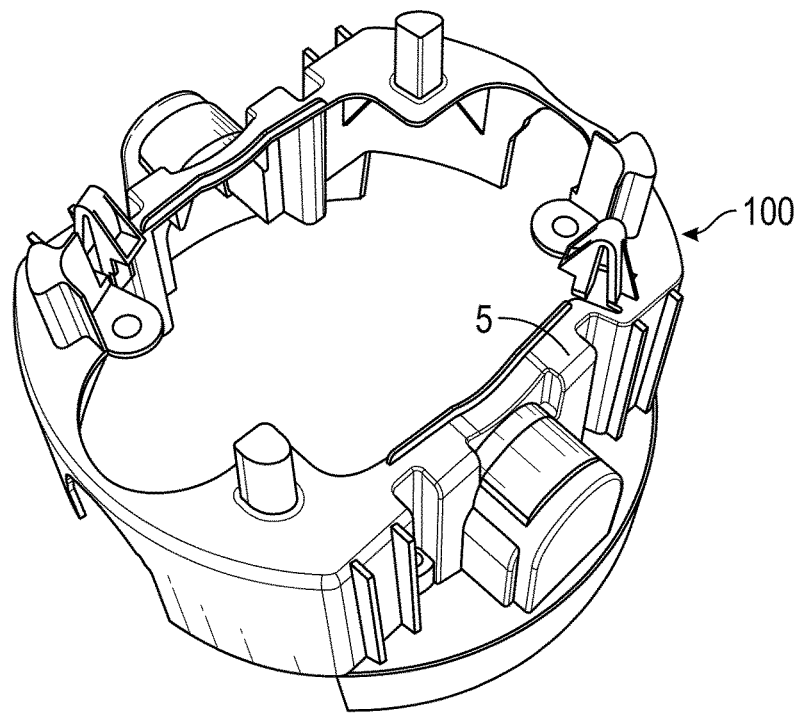
FIG. 16 is a perspective view of the valve body rough-in guide shown in FIG. 14.
Figure 17:
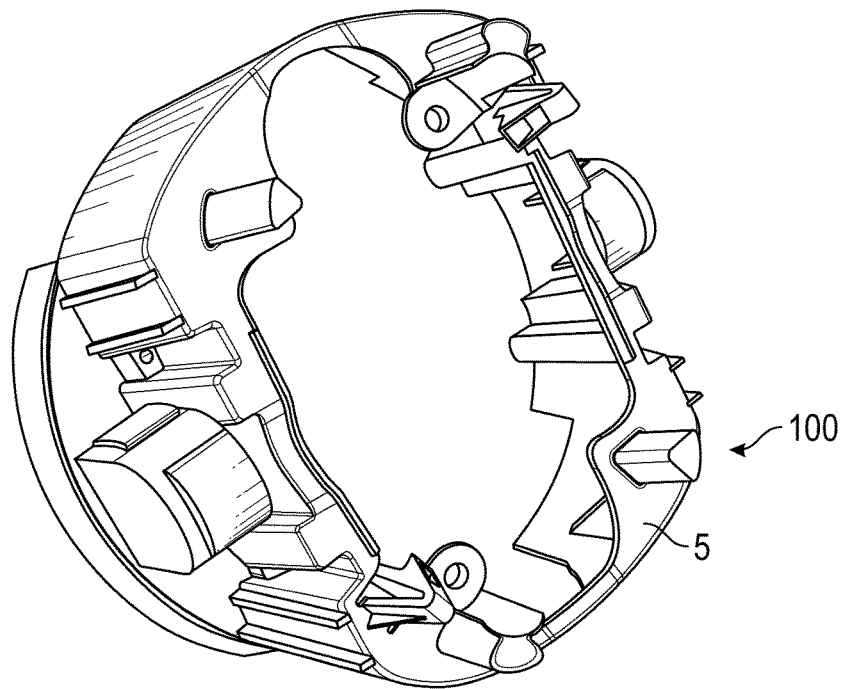
FIG. 17 is a perspective view of the valve body rough-in guide shown in FIG. 14.

FIGS. 11-13 illustrate another exemplary embodiment of a valve body rough-in guide 100 for use with a valve body 200, such as the valve body 200 shown in FIG. 9. According to this exemplary embodiment, the second side 5 contains supporting posts 210. In addition, according to this exemplary embodiment, the valve body retaining guides 130 are of comparable shape and size to the supporting posts 210. In addition, the axial ends of the supporting posts 210 and the axial ends of the valve body retaining guides 130 are coplanar such that the valve body rough-in guide 100 may be balanced on the supporting posts 210 and valve body retaining guides 130. In some applications, any of the valve body retaining guides 130 and the supporting posts 210 may be configured to interface with a wall. For example, in an exemplary embodiment the valve body retaining guides 130 are configured to interface with the wall. In one embodiment, when any of the valve body retaining guides 130 interface with the wall, the level rest 40 is orthogonal to the wall.

In one embodiment, the valve body rough-in guide 100 contains cut-outs 950 designed to accommodate valve bodies 200 during shipping. According to some embodiments, the cut-outs 950 may be larger or smaller depending on the valve bodies 200 being shipping. For example, for valve bodies being shipped with stop bodies (e.g. check valve, stop valves, etc.) may require larger cut-outs 950.

According to various embodiments, the valve body rough-in guide 100 is prepackaged with the valve body 200. In this way, the prepackaged combination of the valve body rough-in guide 100 and the valve body 200 may be provided to a customer simultaneously. Advantageously, the prepackaged combination of the valve body rough-in guide 100 and the valve body 200 allows the valve body 200 to be protected by the valve body rough-in guide 100.

FIGS. 14-17 illustrate yet another exemplary embodiment of a valve body rough-in guide 100 for use with a valve body 200, such as the valve body 200 shown in FIG. 9. The valve body rough-in guide shown in FIGS. 14-17 may share any of the features of the other valve body rough-in guides disclosed herein. According to one embodiment, the second side 5 does not contain valve assembly supports 150 in order to accommodate different valve body 200 styles. However, according to this exemplary embodiment, the valve body rough-in guide 100 contains valve body support arms 250. The valve body support arms 250 may be shaped to fit any size of piping and are intended to support the valve assembly when it is installed into the second side 5.

Figure 18:
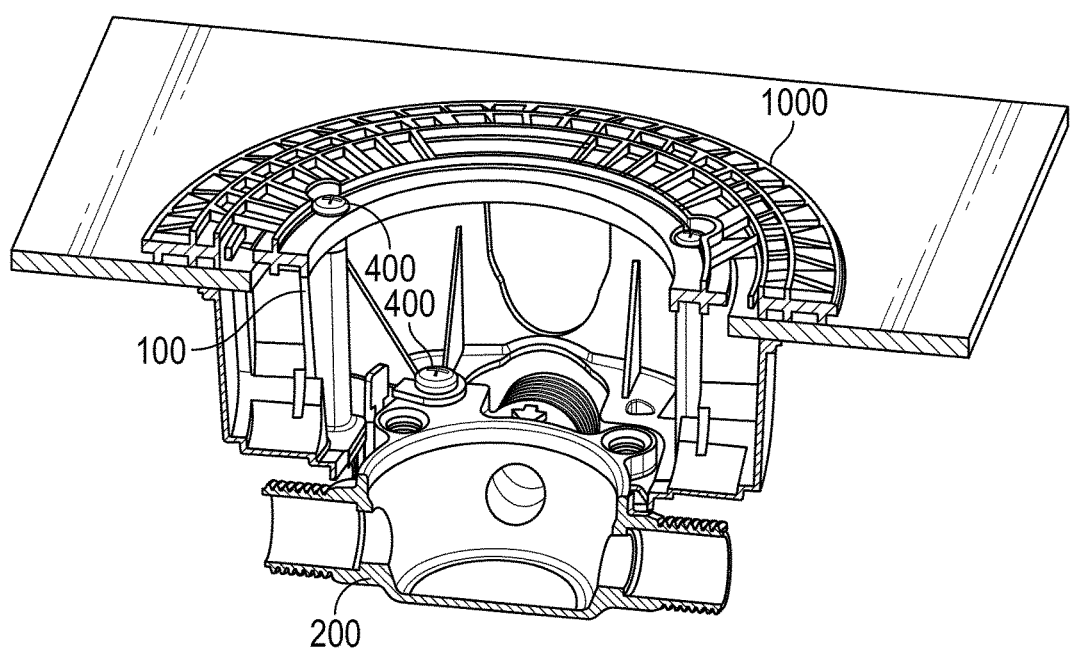
FIG. 18 is a section view of the installed valve body rough-in guide, according to one embodiment.

FIG. 18 illustrates one embodiment of a valve body rough-in guide 100 for use with a valve body 200, such as the valve body 200 shown in FIG. 9. FIG. 18 illustrates a section view of the valve body rough-in guide 100 installed in an application. According to one embodiment, the valve body rough in guide may be secured to a finishing plate (e.g., mounting plate, cover, etc.) 1000 on the opposite side of the wall material 310. FIG. 10 illustrates the path in which a fastener 400 would travel through the fastener channel 50 to secure the valve body rough-in guide 100 to the wall.

While the valve body rough-in guide 100 has been described with regard to the incorporation of the valve body 200, it is understood that the valve body rough-in guide 100 could be utilized with a variety of valves, plumbing, and hydraulic systems. For example, the valve body rough-in guide 100 may be utilized with valves for shower heads, faucets, spray handles, spas, toilets, hot tubs, tubs, steam generators, pressure washers, sinks, mono-block lavatory faucets, bridge style kitchen faucets, bathfill faucets, and other similar systems and devices.

The valve body rough-in guide 100 and the valve body 200 may be constructed of various materials such as brass, aluminum, plastic, polymeric material, thermoset, polymeric-based blends, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material such that the valve body rough-in guide 100 and the valve body 200 may be tailored for a target application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

While the valve body rough-in guide 100 and the valve body 200 have been referenced to control a supply of fluid, it is understood that water, air, or other similar fluids could be controlled through the use of the valve body rough-in guide 100 and the valve body 200.

The construction and arrangement of the elements of the valve body rough-in guide 100 and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes and omissions may also be made in the design, operating conditions and arrangement of the various exemplary embodiments without departing from the scope of the present invention. For example, any element (e.g., flow restrictor, compact flow restrictor, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed:

1. A rough-in guide for a valve body, the rough-in guide comprising:
    a first side including:
        a valve body retaining jaw configured to selectively receive a first portion of the valve body and to secure the valve body to the rough-in guide; and
        a recessed region configured to receive a second portion of the valve body;
    a second side opposite the first side and including a valve body retaining clip;
    wherein the valve body retaining clip is configured to selectively secure the valve body to the rough-in guide; and
    wherein the recessed region extends partially from the first side to the second side.

2. The rough-in guide of claim 1, wherein the first side further comprises a depth gauge recess, a level rest, a tracing edge, and a second depth gauge recess;
    wherein the depth gauge recess is coplanar with the second depth gauge recess; and
    wherein the tracing edge is configured to interface with a wall such that a portion of an outline of the rough-in guide can be traced on the wall.

3. The rough-in guide of claim 2, wherein the second side further comprises a valve body retaining guide;
    wherein the valve body retaining guide is configured to selectively interface with the wall;
    wherein the level rest is configured to be orthogonal to the wall when the valve body retaining guide is configured to interface with the wall; and
    wherein the level rest is configured to receive and support a leveling device.

4. The rough-in guide of claim 2, wherein the second side further comprises:
    a valve assembly support; and
    a valve assembly riser;

wherein the valve assembly riser is configured to protrude from the second side and to support the valve body when the valve body is secured via the valve body retaining clip; and wherein the valve assembly support comprises a recessed contour configured to receive a portion of the valve body when the valve body is secured via the valve body retaining clip.

5. The rough-in guide of claim 4, further comprising a fastener attachment point through the first side and the second side;

wherein the fastener attachment point is configured to receive a fastener from the first side; and wherein the fastener is configured to secure the valve body to the second side.

6. The rough-in guide of claim 5, further comprising a fastener channel through the first side and the second side;

wherein the fastener channel is configured to receive a second fastener from the first side; and wherein the second fastener is configured to secure the rough-in guide to the wall.

7. The rough-in guide of claim 1, further comprising a central opening through the first side and the second side;

wherein the central opening is configured to receive the valve body;

wherein the central opening is defined by a first edge, a second edge, a third edge, and a fourth edge;

wherein the central opening includes a first corner proximate an intersection of the first edge and the second edge and a second corner proximate an intersection of the third edge and the fourth edge; and wherein the second side further comprises a second valve body retaining clip.

8. The rough-in guide of claim 7, wherein the second valve body retaining clip is configured to selectively secure the valve body to the rough-in guide;

wherein the valve body retaining clip is located proximate one of the first corner and the second corner and the second valve body retaining clip is located proximate the other of the first corner and the second corner; and wherein the valve body retaining clip and the second valve body retaining clip each comprise a flexible member configured to be biased by an interaction with the valve body.

9. The rough-in guide of claim 8, wherein the second side further comprises a first valve body retaining guide and a second valve body retaining guide;

wherein the first valve body retaining guide is located proximate one of the first corner and the second corner and the second valve body retaining guide is located proximate the other of the first corner and the second corner; and wherein the first valve body retaining guide and the second valve body retaining guide each comprise an arcuate wall configured to receive a corner of the valve body.

10. The rough-in guide of claim 8, wherein the valve body retaining clip and the second valve body retaining clip are configured to protrude from the second side, to extend through the central opening, and to protrude from the first side.

11. The rough-in guide of claim 1, wherein the recessed region is configured to secure the valve body to the rough-in guide; and wherein the valve body retaining jaw and the recessed region each comprise a contoured arcuate face configured to interface with the valve body.

12. The rough-in guide of claim 11, further comprising a lateral face;

wherein the lateral face comprises a contoured partially-arcuate cut-out; and wherein the contoured partially-arcuate cut-out is aligned with the contoured arcuate face of the valve body retaining jaw.

13. A prepackaged valve assembly comprising:

a valve body; and a one-piece rough-in guide corresponding to the valve body, the one-piece rough-in guide including:

a first side including a recessed region configured to selectively receive the valve body and to secure the valve body to the one-piece rough-in guide; and a second side opposite the first side, the second side including a valve body retaining clip;

wherein the valve body retaining clip is configured to selectively secure the valve body to the one-piece rough-in guide; and wherein the first side is continuous within the recessed region.

14. The prepackaged valve assembly of claim 13, wherein the first side further comprises a valve body retaining jaw configured to selectively receive the valve body and to secure the valve body to the one-piece rough-in guide.

15. The prepackaged valve assembly of claim 14, wherein the second side further comprises a second valve body retaining clip;

wherein the second valve body retaining clip is configured to selectively secure the valve body to the one-piece rough-in guide; and wherein the valve body retaining clip and the second valve body retaining clip each comprise a flexible member configured to be biased by an interaction with the valve body.

16. The prepackaged valve assembly of claim 13, wherein the valve body retaining clip is configured to facilitate removal of the valve body from the one-piece rough-in guide.

17. The prepackaged valve assembly of claim 13, wherein the valve body is contained within a perimeter of the one-piece rough-in guide.

18. A rough-in guide for a valve body, the rough-in guide comprising:

a recessed region configured to receive the valve body, the recessed region comprising a face extending within the rough-in guide that is configured to interface with the valve body; and a valve body retaining clip configured to selectively secure the valve body to the rough-in guide;

wherein the valve body retaining clip comprises a flexible member configured to be biased by an interaction with the valve body.

19. The rough-in guide of claim 18, wherein the recessed region is configured to selectively secure the valve body to the rough-in guide; and wherein the recessed region comprises a contoured arcuate face configured to interface with the valve body.

20. The rough-in guide of claim 19, further comprising a central opening;

wherein the valve body retaining clip is configured to protrude from the rough-in guide on a first side of the rough-in guide, to extend through the central opening, and to protrude from the rough-in guide on a second side of the rough-in guide.

* * * * *